United States Patent [19] [11] 4,438,453
Alston [45] Mar. 20, 1984

[54] CONSTANT LIGHT GREYSCALE GENERATOR FOR CRT COLOR CAMERA SYSTEM

[75] Inventor: Lawrence E. Alston, Chelmsford, Mass.

[73] Assignee: Polaroid Corporation, Cambridge, Mass.

[21] Appl. No.: 341,317

[22] Filed: Jan. 21, 1982

[51] Int. Cl.³ .......................... H04N 1/46; H04N 5/84
[52] U.S. Cl. .......................... 358/78; 358/75; 358/244
[58] Field of Search .......................... 355/68; 354/76; 346/107 A, 110 R; 358/76, 78, 80, 333, 332, 132, 133, 242, 244, 244.1, 244.2, 302; 315/367

[56] References Cited

U.S. PATENT DOCUMENTS

| | | | |
|---|---|---|---|
| 2,531,031 | 11/1950 | de France et al. | 178/5.2 |
| 2,995,619 | 8/1961 | Freeman | 178/5.2 |
| 3,006,260 | 10/1961 | Smith et al. | 95/12 |
| 3,644,664 | 2/1972 | Huboi | 178/5.2 A |
| 3,720,859 | 3/1973 | Hilden | 315/23 |
| 3,772,465 | 11/1973 | Vlahos et al. | 178/5.2 D |
| 3,863,023 | 1/1975 | Schmersal et al. | 358/160 |
| 3,938,164 | 2/1976 | Ohnishi et al. | 346/110 R |
| 4,009,489 | 2/1977 | Seer, Jr. | 358/80 |
| 4,027,315 | 5/1977 | Barney | 354/76 |
| 4,112,459 | 9/1978 | Gautier et al. | 358/6 |
| 4,201,223 | 5/1980 | Barney | 128/653 |
| 4,240,729 | 12/1980 | Barney | 354/76 |
| 4,278,347 | 7/1981 | Okamoto et al. | 355/68 |

*Primary Examiner*—John C. Martin
*Assistant Examiner*—E. A. McDowell
*Attorney, Agent, or Firm*—Edward S. Roman

[57] ABSTRACT

A hard copy of a video frame represented by periodic video signals is obtained by dividing the range of amplitude of the video signals into N levels, converting the video signals into N two-level brightness distributions on the screen of a monochromatic CRT under the condition that a pixel in the ith distribution has the upper of two levels only if the level of the video signal representing the corresponding pixel in the frame exceeds the ith level, and exposing a photosensitive sheet to light from the screen. Thus, each pixel on the sheet is exposed to light of predetermined brightness for a period of time functionally dependent on the level of the video signal represented by the corresponding pixel in the frame.

24 Claims, 15 Drawing Figures

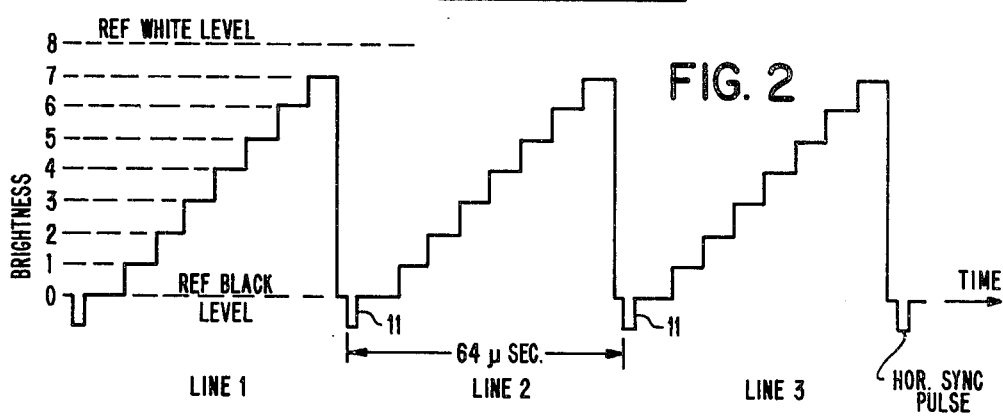
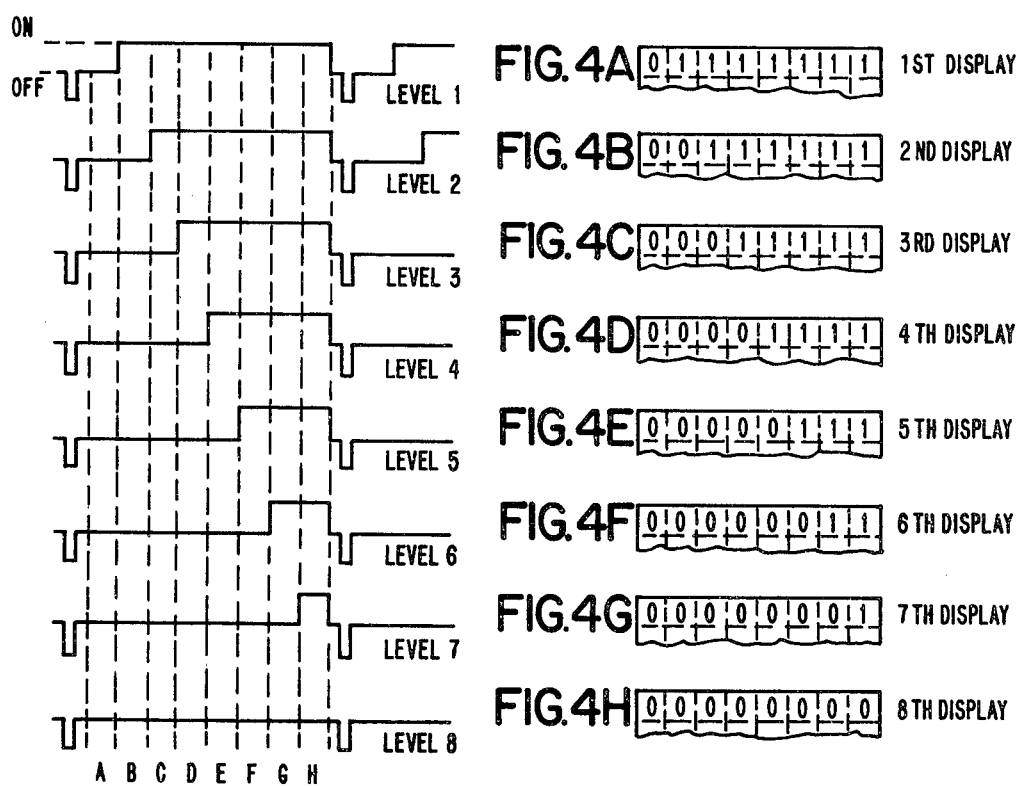

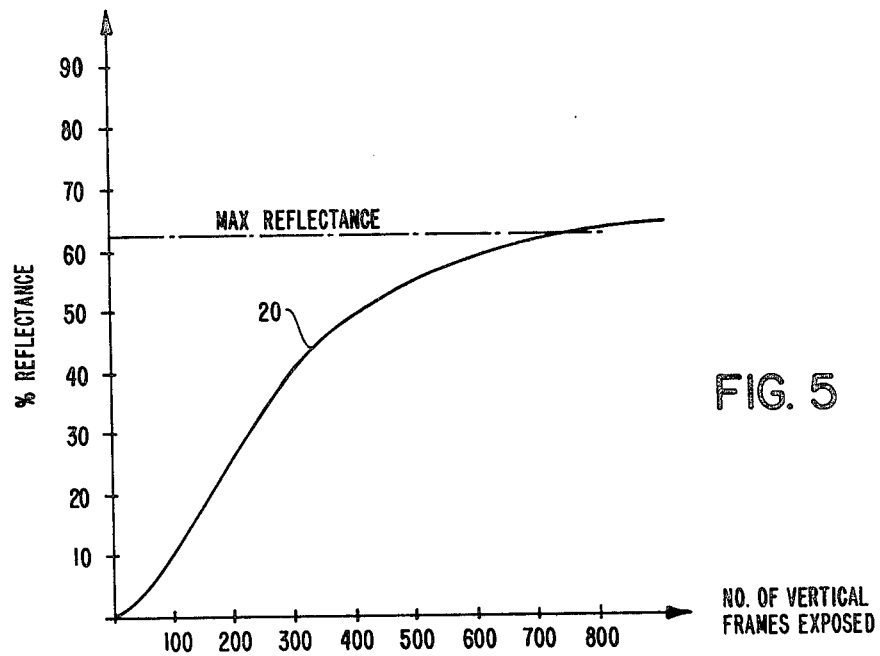
FIG. 5
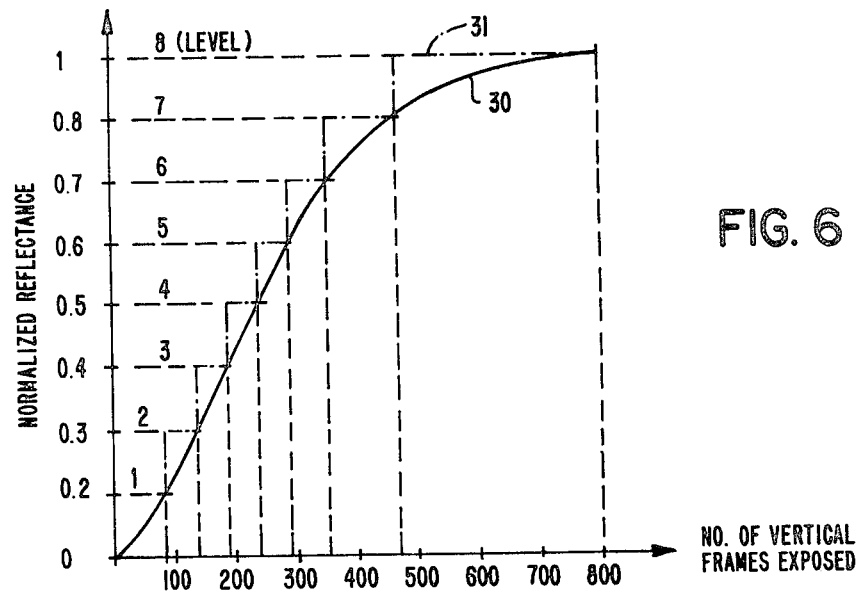
FIG. 6
| LEVEL | NO. OF EXP. | Δ |
|---|---|---|
| 1 | 90 | 90 |
| 2 | 140 | 50 |
| 3 | 190 | 50 |
| 4 | 240 | 50 |
| 5 | 290 | 50 |
| 6 | 350 | 60 |
| 7 | 470 | 120 |
| 8 | 800 | 330 |
FIG. 7

CONSTANT LIGHT GREYSCALE GENERATOR FOR CRT COLOR CAMERA SYSTEM

DESCRIPTION

1. Technical Field

This invention relates to a method of and apparatus for obtaining a hard copy of a video frame represented by periodic video signals that define the frame. Stated otherwise, the invention relates to photographing the screen of a television tube on which the same information is repeatedly displayed by the periodic video signals utilizing a "stop-motion" process that freezes the image on the screen, whereby a color photograph of a color television image can be obtained.

2. Background Art

One approach to obtaining a color hard copy of a color television image is to photograph the screen using color film. This requires a static image, which can be achieved by electronically selecting a video signal representing a television frame and periodically applying this signal to a color television tube. Alternately, a static image can be achieved by utilizing a television camera televising a still scene, or by utilizing the output of a video disk or videotape recorder operating in a stop-frame mode, or by utilizing a computer-generated image. Experience has shown that this approach will reproduce the subject matter in a way which, while satisfactory for some purposes, is of a quality much poorer than that of a direct photograph of the scene being televised in terms of resolution, color rendition, contrast, etc.

A well-known technique is to first divide the color television signal into its color-separation video signals, i.e., the red, blue, and green video signals, then sequentially display these signals on a monochromatic CRT whose screen is photographed through filters in a way that synchronizes the color of the filter to the color of the video signal being displayed on the screen. In this technique, color film would be exposed, typically, for 50 seconds through a red filter to the image on the screen of a monochromatic CRT while the red color-separation image is displayed; typically, for two seconds through a blue filter while the blue color-separation image is displayed on the CRT; and typically, for six seconds through a green filter while the green color-separation image is displayed. In other words, the film will be exposed, typically, to 1500 frames of the red color-separation image, 60 frames of the blue color-separation image, and 180 frames of the green color-separation image. The exposure times will, of course, depend on the optics, the phosphors of the CRT and the type of color film, and the proper exposure time can be determined by trial and error.

While the last-described technique represents an improvement over the quality of image produced by merely photographing a still-frame color video picture, the non-linear response of the CRT in terms of light intensity to input signal level and the non-linear characteristic of most film materials represent inherent deficiencies that will not produce an image approaching the quality of a direct photograph of the scene being televised.

It is, therefore, an object of the present invention to provide a new and improved method of and apparatus for obtaining a hard copy of a video frame represented by periodic video signals where the image quality is improved over that obtained with the techniques known in the prior art.

BRIEF DESCRIPTION OF THE INVENTION

According to the present invention, each picture element (pixel) on a photosensitive sheet is exposed to light of a predetermined brightness for a period of time functionality dependent on the level of the video signal representing the corresponding pixel in the frame. This is to be distinguished from the prior art approach described above, where each pixel on the film is exposed for a predetermined period of time to light whose brightness depends on the level of the video signal representing the corresponding pixel in the frame. In other words, the exposure of a pixel (i.e., the product of the intensity of light incident on the pixel by the time during which light of such intensity is incident on the pixel) in the present invention is determined by varying the time of exposure to light of predetermined brightness, while in the prior art, exposure is determined by varying the brightness of the light. This fundamental change in exposure permits the characteristic curve (i.e., the D&H curve, or density/log E curve) of the film to be taken into account in a way that improves contrast and achieves a photograph more closely approaching the quality of a direct photograph of the scene.

In carrying out the present invention, the range between reference white and reference black in the video signal is divided into N levels, and the video frame is displayed on the screen of a CRT at least N times. For each level, the frame is displayed in terms of a binary brightness distribution wherein a pixel in the display has a predetermined brightness if the amplitude of the pixel in the videos frame exceeds the selected level, or is dark if the amplitude is less. The total time that a frame is displayed at each level is selected to take into account the characteristic curve of the film. Thus, in decomposing the actual video frame into N binary brightness distributions on the screen of a CRT, and varying the time each distribution remains on the screen as a function of the characteristic curve of the film, an improved photograph of the screen can be obtained.

Finally, where the set of video signals represents a frame of a color-separation image, the color of the light to which the photosensitive sheet is exposed should be the same as the color of the color-separation image. In such case, a color hard copy of a color video frame can be obtained by sequentially carrying out the method described above for the red, blue, and green color-separation images. In each case, the film is exposed through a filter compatible with the color of the color-separation image.

BRIEF DESCRIPTION OF THE DRAWINGS

FIG. 1 is a representation of a television screen having vertical bars whose brightness is uniform vertically, the brightness of the bars increasing from left to right;

FIG. 2 is an idealized representation of the video signal that will produce lines on the television screen shown in FIG. 1;

FIG. 3 is a schematic showing of the manner in which the brightness distribution along a given line in the scene shown in FIG. 1 can be broken up into different levels;

FIGS. 4A-H are representations of the television screen shown in FIG. 1 having a binary brightness distribution in accordance with the levels shown in FIG. 3;

FIG. 5 is a typical characteristic curve for a given photosensitive material exposed to monochromatic light or light of a predetermined dominant wavelength;

FIG. 6 is a normalized version of the curve shown in FIG. 5;

FIG. 7 is a chart showing the incremental differences in exposure required to achieve the various levels.

DETAILED DESCRIPTION

Figure 8:
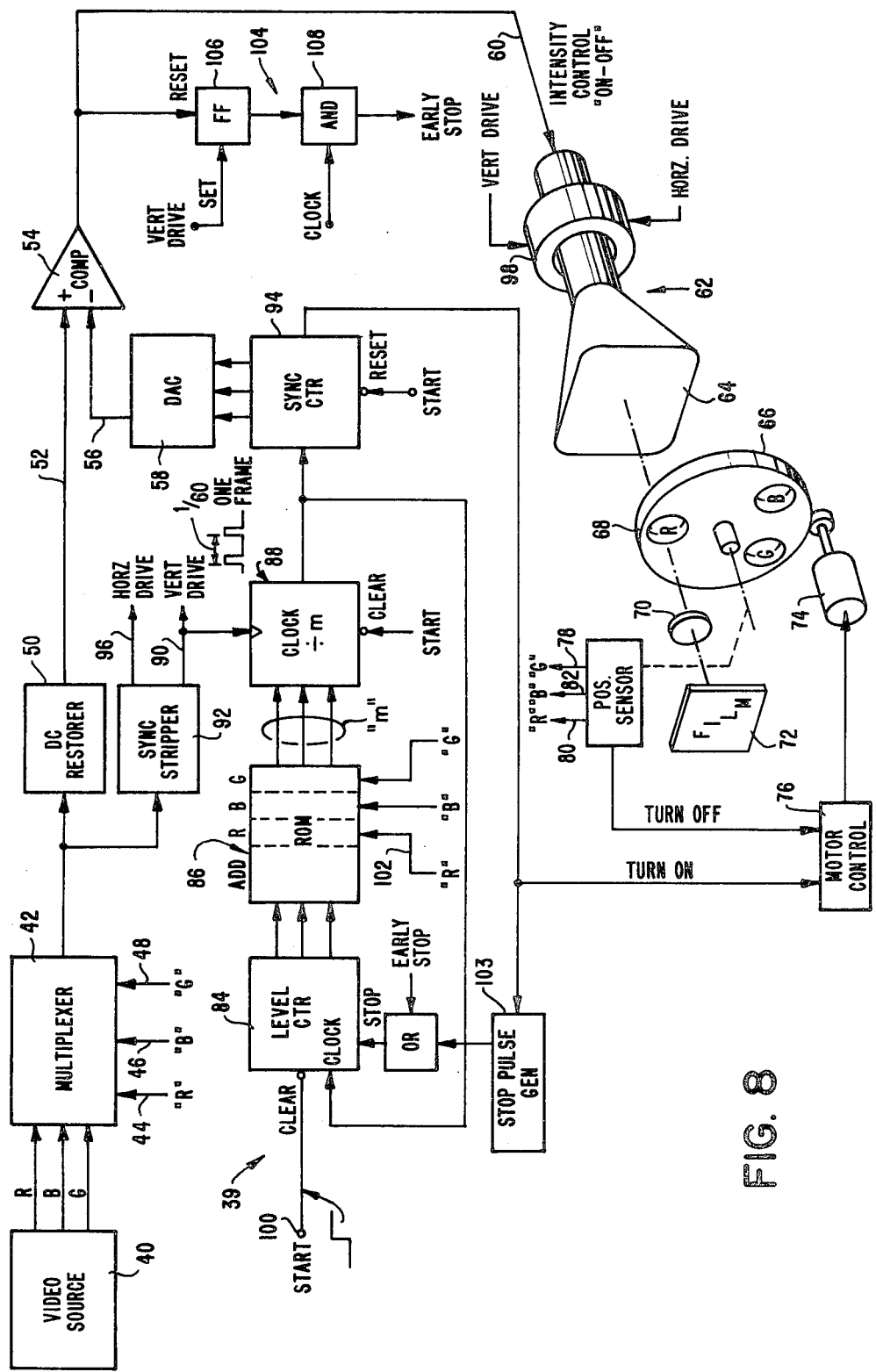
FIG. 8 is a block diagram of apparatus in accordance with the present invention for obtaining a color hard copy of a color video frame.

Before describing the present invention in detail, reference is made to FIGS. 1–3 and 4A–G for the purpose of providing a brief background that will enhance an understanding of the operation of the circuits shown in FIG. 8. In FIG. 1, reference numeral 10 designates the screen of a television monitor having an 8×8 matrix of picture elements (pixels), the brightness of each pixel being designated by the number associated with the pixel. The number "0" designates black, while the number "7" designates the seventh of eight possible levels of brightness. In other words, FIG. 1 would show an arrangement of vertical bars whose brightness is uniform vertically, the brightness increasing from left to right.

In order to create such an image on the television screen in a manner as is well known in the art, each line of the video signal would have a step-shaped form similar to that shown in FIG. 2, which is highly idealized, in the region between horizontal sync pulses 11. As the electron beam sweeps the screen from left to right through columns A to H, the intensity of the beam is modulated in accordance with the amplitude of the video signal shown in FIG. 2. For example, the video signal corresponding to a pixel in row A of a given line would have no amplitude, and would provide a reference black level. On the other hand, the video signal corresponding to a pixel in row H would have a brightness level of 7, which would be close to the reference white level.

In order for the picture to remain "frozen" in time on the television screen, video signals like those shown in FIG. 2 would be applied over and over again to the input of the television, and the result would be a display of vertical bars of varying brightness, as indicated in FIG. 1. In general, a single frame of video signals is applied to the television screen at the rate of thirty times per second, establishing the bar pattern on the screen, which would be perceived by an observer as being stationary in time. In order to obtain a hard copy or photograph of the television screen, a trial-and-error process could be carried out to determine the number of frames that must be displayed on the screen before an acceptable exposure is obtained on the film. In such case, each pixel on the film would be exposed to light from the screen for the same period of time, but the intensity of light incident on a pixel on the film would vary in accordance with the amplitude of the video signal representing the corresponding pixel in the video frame. That is to say, proper exposure of the pixels in column 4 of the television picture, which has "7" units of brightness, may require, say, 10 seconds or 300 frames. However, every pixel on the film would be exposed for the same period of time, and, because of the characteristic curve of the film, it is unlikely that any of the other pixels in the film in columns other than column H would be exposed properly with respect to the pixels in column H.

In order to remedy this situation, the arrangement shown in FIGS. 3 and 4A–H is utilized according to the present invention.

The video signal shown in FIG. 2 can be broken into, say, eight component parts, as illustrated in FIG. 3. That is to say, the eight levels shown in FIG. 3 can, when superimposed on each other, reproduce the video signal shown in FIG. 2. If the level 1 video signal were applied to a television screen, the result would be as shown in FIG. 4A, where the pixels in column A would have no light, while the pixels in columns B–H would have uniform brightness. The result is a thin black bar at the left margin of the picture. Similarly, when the level 2 video signal is applied to the television monitor, the pixels in columns A and B would be dark, while the pixels in columns C–H would be uniformly illuminated. Thus, the use of the video signal shown in FIG. 3 would produce eight two-level or binary brightness distributions on the television screen.

The light on the television screen is integrated on a film to reproduce the distribution shown in FIG. 1. This can be seen by noting from FIG. 4 that the total amount of light, for example, in the pixels in column H would total 7, which is the value of the pixel in column H shown in FIG. 1.

There are two advantages to the approach described above in that the television monitor can then be an ON-OFF type of display such as can be achieved with LCD- or LED-type displays where each pixel in the display has either an off condition, in which no light is produced, or an on condition, where a predetermined amount of light is produced. With the arrangement shown in FIGS. 3 and 4, the exposure of the film to light of each level can be tailored to match the characteristic curve of the film. This is illustrated in FIGS. 5 and 6, to which reference is now made.

Experimentally, the film is exposed to light of a predetermined level for variable periods of time in order to create curve 20, which may be termed the characteristic curve of the film, because it represents the relationship between the density of the film as a function of its exposure. Curve 20 is a fictitious curve, and represents a typical type of a curve, such curve being a function of the particular film involved, as well as the dominant wavelength of the light incident on the film. In other words, where color photography is being utilized, a characteristic curve would be generated for each of the three primary colors, red, blue, and green and the curve shown in FIG. 5 is merely illustrative of any of the curves that would be obtained.

In preparation for incorporating the characteristic curve into the exposure system for obtaining a hard copy from a video image, curve 20 may be redrawn, as shown in FIG. 6, by normalizing the percent reflectance shown in FIG. 5. That is to say, the maximum reflectance shown in FIG. 5 may be, for the example shown, 62.5%, which would constitute unit normalized reflectance. Curve 30, shown in FIG. 6, is the normalized characteristic curve for a particular film and a given color. If the normalized reflectance is divided into eight levels, as indicated in FIG. 6, then the time, i.e., the number of frames over which the film must be exposed to obtain proper exposure for each level, is determined by the intercept of the level with curve 30. The results are summarized in the chart shown in FIG. 7 where, for example, it can be seen that about 90 frames are required to properly expose a pixel whose brightness is level "1". To properly expose a pixel whose brightness is level "2", a total of 140 frames would be required. However, because 90 frames have already been achieved to properly expose the level 1 pixels, only 50 additional frames are required for level "2" pixels. Thus, the rightmost column in FIG. 7 represents the incremental change in frames required on a level-by-level basis. The non-linear relationship between the exposure time and the level is illustrated by chain line 31, shown in FIG. 6.

In actuality, when color hard copies of a television image are to be obtained, a set of curves like those shown in FIGS. 5 and 6 is obtained for each of the colors of the color-separation images available. That is to say, a red video signal would be applied to the television monitor for producing light of a predetermined intensity, and such light would be incident on a film to achieve the red color-separation image characteristic curve. The process would be repeated for the blue and the green color-separation images, and three charts like that shown in FIG. 7 would be obtained, the rightmost column of each chart representing the number of frames the various levels must be incrementally exposed for each of the color-separation images at each level.

An embodiment for carrying out the invention to achieve a color hard copy of a video frame represented by the three sets of red, blue, and green color-separation images is shown in FIG. 8, to which reference is now made.

Video source 40 shown in FIG. 8 schematically represents a source of red, blue, and green color-separation video signals such as the output of a conventional color television receiver, a videodisk or videotape recorder, or the output of a computer-generated image system. The essential factor in connection with source 40 is that it produce, either sequentially or simultaneously, the three color-separation image video signals, and that the signals be repeated over and over. Multiplexer 42 receives the three color-separation video signals and, depending upon which of the three selector lines 44, 46, 48 is activated, the output of multiplex 42 will be one of the three color-separation video signals.

The output of multiplexer 42 is applied through DC restorer 50 to signal channel 52 of comparator 54, which produces an output when the video signal applied to its signal input exceeds a threshold defined by a voltage applied to reference channel 56 of the comparator. This reference voltage is produced at the output of digital-to-analog converter (DAC) 58 in the manner described below.

Comparator 54 functions to achieve signals like those shown in FIG. 3, by slicing the video at a level determined by the output of DAC 58. Comparator 54 will produce an output only if the video signal input is in excess of the voltage established by the output of DAC 58; and such output operates on intensity control 60 of monochrome CRT 62 to turn on the beam. When there is no output from the comparator, the beam will remain turned off. In this way, a two-level or binary brightness distribution will be established on screen 64 of CRT 62 in accordance with the level established by the output of DAC 58 and the information in the video signal.

Light from screen 64 passes through one of the filters on filter wheel 66, and then through lens 70, where it is focused onto a film plane containing color film 72. Filter wheel 66 has three possible positions for locating any one of a red, blue, or green filter in alignment with lens 70. The angular position of the filter wheel is established by motor drive 74, whose operation is controlled by motor control 76; and position sensor 78 senses the angular position of the filter wheel, and produces a control signal that identifies the particular filter aligned with lens 70. In the illustration shown in FIG. 8, red filter 68 is aligned with lens 70, and position sensor 78 produces an output on line 80 indicative of this condition. This signal on line 80 is applied to line 44 associated with multiplexer 42, permitting only the red color-separation video image to be applied to DC restorer 50. In the event that motor control 76 were operated to index filter wheel 66 until the blue filter is aligned with lens 70, then position sensor 78 would produce an output in line 82 which would be applied to line 46 of multiplexer 42, thereby permitting only the blue video signal to be applied to DC restorer 50, etc. In this manner, the color of the video signal used to establish the binary brightness distribution on screen 64 of CRT 62 is synchronized with the color of the filter aligned with lens 70.

According to the present invention, apparatus 39 includes level counter 84, the output of which addresses a read-only memory (ROM) 86, whose output is a number "m" that establishes the number by which divider 88 operates on the vertical drive output 90 of sync stripper 92 for producing an output that increments both counter 84 and sync counter 94, whose contents are identical to the contents of level counter 84. Read-only memory 86 constitutes a look-up table in which information obtained experimentally from the characteristic curves shown in FIGS. 5 and 6 is tabulated for each of the red, blue, and green color-separation video signals. If the right-hand column of the chart shown in FIG. 7 constitutes the number of vertical frames that must be applied in order to achieve proper exposure at the various levels, as indicated in the chart, then the contents of the right-hand column of this chart would constitute the contents of the read-only memory for the red color-separation image.

In a similar way, the blue and green entries in the look-up table would be determined, and the contents of the read-only memory could be established. Counter 84 addresses the read-only memory in accordance with the level under consideration, and the output of position sensor 78 is effective to select which of the red, blue, or green columns in the read-only memory is to be activated. As a consequence, the contents of level counter 84 and the selected filter in the filter wheel 66 determine a cell in the read-ony memory, the contents of which cell establishes the number of times a frame will appear on screen 64 of CRT 62. This timing is achieved through the use of sync stripper 92 and clock 88. The sync stripper is a conventional apparatus which operates on the video signals produced at the output of multiplexer 42, stripping the synchronization pulses from the video signals for the purpose of providing horizontal drive 96, as well as vertical drive 90, which are applied to deflection coil 98 of the CRT. The output of horizontal drive 96 is a pulse train at 15,750 Hz when the conventional NTSC television system is being utilized, and provides drive for deflecting the electron beam in CRT 62 horizontally across the screen 64. Vertical drive 90 is a train of pulses whose frequency is 60 Hz, this providing the frame frequency for the system, which in this example is a non-interlaced system where one frame equals one field. In this manner, the electron beam of tube 62 is caused to trace a raster on screen 64 of the tube, the raster being traced 60 times per second.

Clock 88, under the control of the selected cell of read-only memory 86, will divide the vertical drive pulses produced by sync stripper 92 by a number whose value is the number contained in the cell addressed by level counter 84 and the particular output of position sensor 78, which is determined by the color of the filter in filter wheel 66 aligned with lens 70. For example, if the contents of level counter 84 is the number "3", level "3" of the video signal will be under investigation. Further, if the red filter is aligned with lens 70, then the cell addressed by level detector 84 and the "R" line will contain the number 50, which will be applied to clock 88 for the purpose of producing an output pulse after fifty vertical pulses have been produced by sync stripper 92. The pulse appearing at the output of clock 88 serves two purposes, namely, the incrementing of sync counter 94 to the next level (i.e., 4), and the incrementing of level counter 84 to the next level. At this point, a different cell in the read-only memory is addressed, and clock 88 will then divide by the number contained in that cell.

The level determined by the contents of sync counter 94 is converted into an analog signal by digital-to-analog converter 58, thereby establishing a threshold for comparator 54. As counter 94 is incremented, the threshold continues to step upwardly, as indicated by reference level numerals 1–8 in FIG. 6, the time during which the voltage appears at a given level being determined by the contents of read-only memory 86.

In operation, an unexposed sheet of color film 72 is placed in position behind lens 70 in the focal plane thereof. Video source 40 is operated to produce three sets of periodic video signals, corresponding to the red, blue, and green color-separation images associated with a color television picture. Assuming that the red filter is aligned with lens 70 so that lead 80 of position sensor 78 is activated, multiplexer 42 will produce, at its output, the red video frame, as defined by a set of periodic video signals. This set of signals is repeated until line 44 to the multiplexer is no longer activated.

After DC restoration, the video signal is applied to the signal input of comparator 54. The synchronizing pulses are stripped from the video signal by stripper 92, and produce the horizontal and vertical drive for the deflection circuit associated with CRT 62. When a "start" command is applied at input 100, level counter 84, sync counter 94, and clock 88 are cleared. The "0" level of counter 84 is applied to read-only memory 86, addressing one row of the memory, the column addressed being determined by the output of position sensor 78. Inasmuch as line 80 is activated, the "R" line 102 of read-only memory 86 is enabled, thereby permitting the contents of the "0" level cell in the selected column to be read into and determine the operation of clock 88. This establishes the divisor for the vertical sync pulses, so that after the required number have been applied to clock 88, the latter produces an output pulse which increments sync counter 94 and level counter 84. During the time that clock 88 is counting, and prior to its producing an output pulse, DAC 58, operating on the output of sync counter 94, will produce a voltage corresponding to the "0" level to the reference input of comparator 54. Any time that the video signal applied to the signal input of comparator 54 exceeds the threshold established at input 56 by the output of DAC 58, comparator 54 will produce an output which will turn on the beam of CRT 62, producing a spot of light on screen 64 at a location depending upon the location of the pixel in the video signal with respect to the entire frame. Thus, a monochromatic two-level or binary brightness distribution is produced on screen 64, much like any of the displays illustrated in FIGS. 4A–H. The display remains on the screen for a period of time determined by the contents of the addressed cell in read-only memory 86. When this time expires, the output produced by clock 88 will change the threshold voltage applied to comparator 54, and will, at the same time, permit selection of a new time by reason of the re-addressing of read-only memory 86. The situation is repeated until counters 84 and 94 have been incremented through all of the available levels. At each level, a two-state brightness distribution will be displayed on the screen, the film being exposed to the displays on the screen through a filter compatible with the color of the video color-separation image.

The contents of counter 94 is decoded so that, when it reaches its maximum (i.e., the maximum level), an output pulse appears which operates stop-pulse generator 103, thereby stopping counter 84, and applying a turn-on signal to motor control 76. Motor 74 is thus energized, and rotates filter wheel 66 until the next colored filter is aligned with lens 70. The position of the filter wheel is sensed by position sensor 78, thereby deactivating line 80 and activating, say, line 82 when the blue filter is aligned with the lens, thereby shifting the output of multiplexer 42 from the red color-separation video signal to the blue color-separation video signal. Simultaneously, another column of the read-only memory is activated in preparation for exposing the film to the blue color-separation image when a start signal is applied.

In response to another start signal, the cycles described above are repeated once again through all the levels, producing on screen 64, for each brightness level, a two-level or binary brightness distribution based on the blue color-separation image. The exposure duration for each level is determined in accordance with the contents of the read-only memory; and after this is completed, the changes indicated above occur once again to enable the green color-separation image information to be applied to film 72. After the three color-separation images are sequentially produced on screen 64 and the exposure of film 72 is completed, the film can be developed, and a hard copy of a video frame will be produced.

In order to speed up obtaining a hard copy, the circuit indicated generally at 104 can be utilized. This circuit senses when a level has been reached which contains no useful information, and is effective to short-circuit or terminate further operation of counters 84 and 94. As seen in FIG. 8, flip-flop 106 is set after each frame is displayed by a vertical drive pulse. If there is no output at a given level from comparator 54, which means that no additional information is contained in the video signal because there are no pixels with amplitudes greater than the current level under consideration, circuit 104 is effective to terminate further operation to permit the application of the next color-separation image to the film. In such case, flip-flop 106 will be in its set state when the next clock pulse appears to increment counters 84 and 94; and such clock pulse will appear at AND-gate 108 while flip-flop 106 is in its set state. Consequently, AND-gate 108 will produce what is termed an "early stop signal", which is effective to stop clock 84 and terminate operation. However, if the video signal contains information that toggles the intensity control, which is to say that the video signal has a pixel with a brightness condition which exceeds the threshold of comparator 54, flip-flop 106 will be reset. When the next clock pulse appears corresponding to the next higher level, AND-gate 108 will not produce an early stop pulse, and the staircase increase of voltage at the reference input to comparator 54 will continue.

From the above description, it can be seen that the present invention provides a method for obtaining a hard copy of a video frame represented by a set of periodic video signals, including the step of exposing each pixel on a photosensitive sheet to light of a predetermined brightness for a period of time functionally dependent on the level of the video signal representing the corresponding pixel in the frame. As seen in FIG. 8, counters 84 and 94, ROM 86, and clock 88, together with DAC 58, constitute means for shifting the reference voltage applied to the reference input of comparator 54. Counters 84 and 94 constitute means for establishing the reference voltage; and ROM 86, as its operation affects the operation of clock 88, maintains the voltage at a predetermined level for a period of time functionally related to the level.

It should be noted that counters 84 and 94 can be combined into a single counter, because the contents of each of these counters is identical at any given time. However, for simplification purposes, two counters are shown. Thus, these counters constitute means for shifting the voltage applied to the reference input of the comparator at a frequency functionally related to and synchronized with the frame frequency of the television system.

It should be further noted that, although an analog comparator and an analog video signal are described, it would also be readily apparent to utilize a digital video signal with a digital comparator wherein the digital comparator may comprise both the comparator 54 and the DAC 58.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A method of obtaining a hard copy of a video frame represented by periodic video signals which lie within a predetermined range of amplitudes that define N levels of brightness comprising the steps of:
   comparing the amplitude of the video signals with a reference signal level to provide a select output signal when the amplitude of the video signals is at least equal to the amplitude of said reference signal;
   shifting the reference signal level through N levels corresponding to the N levels of brightness defined by the predetermined range of video signal amplitudes at a frequency functionally related to and synchronized with the periodic frequency of the video signals;
   deflecting a CRT in response to the sync signals in the video signals so as to cause the beam of the CRT to trace out a raster on the screen of the CRT and controlling the intensity of the beam to provide a two-level brightness distribution with the upper of said two levels of brightness occuring in response to said select output signal from said comparator; and
   exposing a sheet of photosensitive material to the screen of the CRT.

2. A method according to claim 1 wherein the period of time for which each pixel on the sheet is exposed to light at the upper of the two levels of brightness is a non-linear function of the amplitude of the video signal representing the corresponding pixel of the frame.

3. A method according to claim 2 wherein the video signal represents a frame of a color-separation image, the color of the light to which the photosensitive sheet is exposed being the same as the color of the color-separation image.

4. A method for obtaining a color hard copy of a color video frame by sequentially using the method of claim 3 for red, blue, and green color-separation images.

5. An apparatus for obtaining a hard copy of a video frame represented by a periodic video signal comprising:
   (a) a comparator having signal and reference inputs for producing an output when the signal applied to its signal input exceeds a threshold defined by the voltage applied to its reference input;
   (b) means for applying said video signal to the signal input of said comparator;
   (c) means for shifting said voltage applied to the reference input of said comparator at a frequency functionally related to and synchronized with the periodic frequency of the video signal;
   (d) a CRT having a deflection circuit responsive to the sync signal in the periodic video signal for causing the beam of the CRT to trace out a raster on the screen of the CRT, and having an intensity control responsive to the output of said comparator for controlling the intensity of the beam whereby a two-level brightness distribution is produced on the screen; and
   (e) means for stationing a sheet of photosensitive material for exposure to the screen of the CRT.

6. Apparatus according to claim 5 wherein the means for shifting said voltage applied to the reference input of said comparator includes means for establishing and maintaining said voltage at each of a plurality of predetermined levels for a period of time functionally related to that predetermined level.

7. Apparatus according to claim 6 wherein said means for establishing and maintaining said voltage is constructed and arranged so that each said period of time is a non-linear function of its said predetermined level.

8. Apparatus according to claim 7 wherein said means for establishing and maintaining said voltage comprises a level counter whose contents represent one of said plurality of predetermined levels, and a look-up table comprising a plurality of cells addressed by the contents of said level counter, wherein the contents of the cell addressed by said counter represents the time during which said voltage is applied to the reference input of said comparator.

9. Apparatus according to claim 8 wherein said means for establishing and maintaining said voltage includes a variable divider circuit responsive to the contents of the cell addressed by said level counter for producing an output pulse when the number of input pulses to said divider counter equals the contents of the cell addressed by said level counter, and a sync stripper responsive to the periodic video signals for producing a train of frame pulses which are synchronized with the periodic video signals, and which are applied to the input of said divider circuit.

10. Apparatus according to claim 9 wherein said level counter increments in response to the output of said divider circuit.

11. Apparatus according to claim 9 wherein said means for establishing and maintaining said voltage produces a voltage which is representative of the contents of said level counter, and which is applied to the reference input of said comparator.

12. Apparatus according to claim 11 wherein the means for establishing and maintaining said voltage includes a sync counter incremented by the output of said comparator, and a DAC responsive to the contents of said sync counter for producing said voltage.

13. Apparatus according to claim 12 wherein said sync counter is separate from said level counter.

14. Apparatus according to claim 12 including means for stopping and resetting said level counter.

15. Apparatus according to claim 14 wherein said means for stopping and resetting is responsive to the contents of said sync counter.

16. Apparatus according to claim 15 wherein said means for stopping and resetting is also responsive to the failure of the video signals to exceed a selected level.

17. A method of obtaining a hard copy of a video frame represented by periodic video signals which lie within a predetermined range of amplitudes that define N levels of brightness comprising the steps of:
comparing the amplitude of the video signals with a reference signal level to provide a select output signal when the amplitude of the video signals is at least equal to the amplitude of said reference signal;
shifting the reference signal level through N levels corresponding to the N levels of brightness defined by the predetermined range of video signal amplitudes at a frequency functionally related to and synchronized with the periodic frequency of the video signals;
controlling the intensity of a display screen to provide a two-level brightness distribution with the upper of said two levels of brightness occuring in response to said select output signal from said comparator; and
exposing a sheet of photosensitive material to said display screen.

18. A method according to claim 1 wherein the period of time for which each pixel on the sheet is exposed to light at the upper of the two levels of brightness is a non-linear function of the amplitude of the video signal representing the corresponding pixel of the frame.

19. A method according to claim 18 wherein the video signal represents a frame of a color-separation image, the color of the light to which the photosensitive sheet is exposed being the same as the color of the color-separation image.

20. A method for obtaining a color hard copy of a color video frame by sequentially using the method of claim 17 for red, blue, and green color-separation images.

21. An apparatus for obtaining a hard copy of a video frame represented by a periodic video signal comprising:
(a) a comparator having signal and reference inputs for producing an output when the signal applied to its signal input exceeds a threshold defined by the voltage applied to its reference input;
(b) means for applying said video signal to the signal input of said comparator;
(c) means for shifting said voltage applied to the reference input of said comparator at a frequency functionally related to and synchronized with the periodic frequency of the video signal;
(d) a display screen;
(e) an intensity control responsive to the output of said comparator for controlling the intensity of said display screen whereby a two-level brightness distribution is produced on said display screen; and
(f) means for stationing a sheet of photosensitive material for exposure to said display screen.

22. Apparatus according to claim 21 wherein the means for shifting said voltage applied to the reference input of said comparator includes means for establishing and maintaining said voltage at each of a plurality of predetermined levels for a period of time functionally related to that predetermined level.

23. Apparatus according to claim 22 wherein said means for establishing and maintaining said voltage is constructed and arranged so that each said period of time is a non-linear function of its said predetermined level.

24. Apparatus according to claim 23 wherein said means for establishing and maintaining said voltage comprises a level counter whose contents represent one of said plurality of predetermined levels, and a look-up table comprising a plurality of cells addressed by the contents of said level counter, wherein the contents of the cell addressed by said counter represents the time during which said voltage is applied to the reference input of said comparator.

* * * * *